United States Patent
Li et al.

(10) Patent No.: US 11,831,694 B2
(45) Date of Patent: Nov. 28, 2023

(54) METHOD AND SYSTEM FOR CONTENT MANAGEMENT FOR A VIRTUAL MEETING

(71) Applicant: Lenovo (Singapore) Pte. Ltd., New Tech Park (SG)

(72) Inventors: Scott Li, Cary, NC (US); Igor Stolbikov, Apex, NC (US); Kelly Rikard, Clayton, NC (US); Rod D. Waltermann, Rougemont, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 113 days.

(21) Appl. No.: 17/446,061

(22) Filed: Aug. 26, 2021

(65) Prior Publication Data

US 2023/0061821 A1   Mar. 2, 2023

(51) Int. Cl.
*H04L 65/403* (2022.01)
*H04L 65/401* (2022.01)
*G06F 9/455* (2018.01)

(52) U.S. Cl.
CPC ........ *H04L 65/403* (2013.01); *G06F 9/45558* (2013.01); *H04L 65/4015* (2013.01); *G06F 2009/45595* (2013.01)

(58) Field of Classification Search
CPC .............. H04L 65/403; H04L 65/4015; G06F 9/45558; G06F 2009/45595
USPC ......................................................... 709/204
See application file for complete search history.

(56) References Cited

U.S. PATENT DOCUMENTS

| | | | |
|---|---|---|---|
| 2012/0216131 A1* | 8/2012 | Moyers | H04L 65/1069 715/757 |
| 2020/0326846 A1* | 10/2020 | Leong | H04M 7/0027 |
| 2021/0120208 A1* | 4/2021 | Morris | H04L 65/403 |
| 2022/0365984 A1* | 11/2022 | Faulkner | H04L 65/1089 |
| 2023/0028495 A1* | 1/2023 | Yoshifuji | G06F 8/51 |

* cited by examiner

*Primary Examiner* — Frantz B Jean
(74) *Attorney, Agent, or Firm* — THE SMALL PATENT LAW GROUP LLC; Dean D. Small

(57) ABSTRACT

An electronic device is provided that includes a display, a processor, and a data storage device having executable instructions accessible by the processor. Responsive to execution of the instructions, the processor displays a user desktop related to a user, creates a virtual meeting that is configured to be attended by communication through a network by at least one network based electronic device, generates a shared desktop related to the virtual meeting that is configured to be shared with the at least one network based electronic device via the network, and displays the shared desktop during the virtual meeting.

20 Claims, 5 Drawing Sheets

METHOD AND SYSTEM FOR CONTENT MANAGEMENT FOR A VIRTUAL MEETING

BACKGROUND

Embodiments herein generally relate to methods and systems for controlling and managing content presented during a virtual meeting.

Virtual meetings have become prevalent in society. With Covid-19 causing businesses to shut down centrally located buildings, working from home, and conducting meetings over a meeting application have become common. Meeting applications such as Zoom, Webex, gotoMeeting, Google Meets, etc. have provided platforms where an individual can provide a common shared link to a group of individuals along with a meeting password, code, or both.

Consequently, on-line meetings have become a vital component of the work from home experience to collaborate with team member. However, on-line meetings typically lack enablement, provisioning, and management of virtual resources attached to a particular meeting instance. For example, one instance of virtual resources is the shared desktop function. The shared desktop function for virtual meetings has existed for many years; however, is inadequate to handle the modern virtual conference workflow, because a user can share their private desktop where sensitive information can be leaked and interrupts workflow setup.

For example, on occasion, when an individual shares their display during a virtual meeting, the presenter has not adequately safeguarded confidential information, or done an adequate job to removing personal information from their display screen. Sometimes the presenter is working on multiple projects, has their email open, has recently opened other materials not related to the meeting, etc. that ends up on the shared screen when the presenter changes between documents, finishes a presentation, etc. As a result, personal information, confidential information, etc. ends up being displayed on the shared screen for everyone to see. Other times, during a meeting, an individual who was not intending to share their screen may have information relevant to a discussion, resulting in them sharing their screen. As a result, such an individual has not prepared their screen for sharing with the group, including closing sensitive documents, emails, websites, etc. before their screen is shared. As a result, embarrassing personal information, inadvertent confidential information, or the like is accidentally shared when screen sharing occurs.

In addition to inadvertent disclosures, screen sharing also can cause complications based on asymmetrical bandwidth and computing as a result of different electronic devices being utilized to share information. In one example, an individual on a meeting using a mobile device may experience desktop sharing issues as well.

SUMMARY

In accordance with embodiments herein, an electronic device is provided that includes a display, a processor, and a data storage device having executable instructions accessible by the processor. Responsive to execution of the instructions, the processor displays a user desktop related to a user, creates a virtual meeting that is configured to be attended by communication through a network by at least one network based electronic device, generates a shared desktop related to the virtual meeting that is configured to be shared with the at least one network based electronic device via the network, and displays the shared desktop during the virtual meeting.

Optionally, responsive to execution of the instructions, the processor further obtains meeting content input into a meeting application, and generates the shared desktop based on the meeting content. In one aspect, responsive to execution of the instructions, the processor further launches the virtual meeting that includes the shared desktop based on the meeting content. In another aspect, responsive to execution of the instructions, the processor further: invites attendees based on the meeting content. In one example, responsive to execution of the instructions, the process further determines a shared desktop identifier, and communicates the shared desktop identifier to the at least one network based electronic device. In another example, the shared desktop identifier is one of a password, executable code, or a key. In yet another example, the shared desktop includes a user interface for controlling access to the shared desktop. In one embodiment, the network includes at least one of a cloud, a cellular network, a wireless network, or a Wi-Fi based network.

In accordance with embodiments herein, a method is provided that includes, under control of one or more processors including program instructions to display a user desktop related to a user, and create a virtual meeting that is configured to be attended by communication through a network by at least one network based electronic device. In addition, the method also includes under control of one or more processors including program instructions to generate a shared desktop related to the virtual meeting that is configured to be shared with the at least one network based electronic device via the network, and display the shared desktop during the virtual meeting.

Optionally, the one or more processors include program instructions to obtain meeting content input into a meeting application, and generate the shared desktop based on the meeting content. In one aspect, the one or more processors include program instructions to launch the virtual meeting that includes the shared desktop based on the meeting content. In another aspect, the one or more processors include program instructions to invite attendees based on the meeting content. In one example, the one or more processors include program instructions to determine a shared desktop identifier, and communicate the shared desktop identifier to the at least one network based electronic device. In another example, the one or more processors include program instructions to save the shared desktop in response to an end of the virtual meeting.

In accordance with embodiments herein, a computer program product is provided that includes a non-signal computer readable storage medium comprising computer executable code to display a user desktop related to a user, and create a virtual meeting that is configured to be attended by communication through a network by at least one network based electronic device. The computer executable code also to generate a shared desktop related to the virtual meeting that is configured to be shared with the at least one network based electronic device via the network, and display the shared desktop during the virtual meeting.

Optionally, the computer executable code obtains meeting content input into a meeting application; and generate the shared desktop based on the meeting content. In one aspect, the computer executable code launches the virtual meeting that includes the shared desktop based on the meeting content. In another aspect, the computer executable code determines a shared desktop identifier, and communicate the shared desktop identifier to the at least one network based electronic device. In one example, the computer executable code grants access to the at least one network based electronic device to alter the shared desktop based on the shared desktop identifier. In another example, the computer executable code saves the shared desktop for a determined period in response to an end of the virtual meeting.

DETAILED DESCRIPTION

Figure 1:
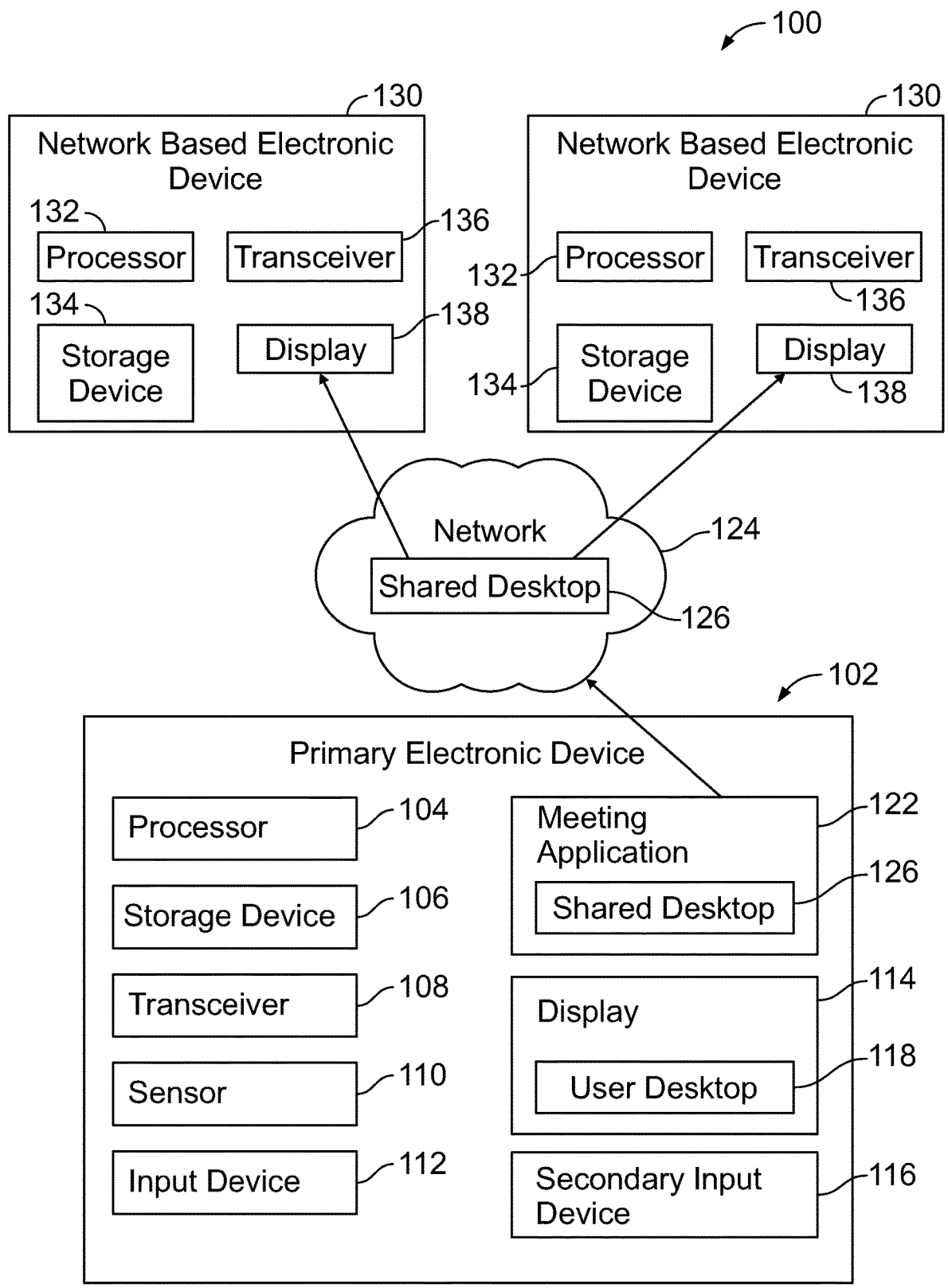
FIG. 1 illustrates a schematic diagram of a system for content management for a virtual meeting in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "resource" refers to any non-network retrievable or network retrievable structure that has identity and is returned by a resource manager in response to a request. Non-limiting examples include a file or document, presentation, webpage on the World Wide Web, a local area network, or a wide area network, or the like. The documents, or presentations may include words, phrases, text, images, graphics, etc. that are considered content. The webpage may include an HTML and/or scripts, words, phrases, text, images, graphics, etc. that are also considered content. The webpage is often hyperlinked to other documents on the Web/network. A network responsive resource includes network retrievable structure that has identify and is returned by a resource manage in response to a request. Network retrievable content can remain constant or change over time. As an example, a network responsive resource can be dynamic. Network responsive resources may be characterized as abstract responsive resources or information responsive resources. URLs, particularly HTTP URIs, are frequently used to identify abstract resources, such as classes, properties or other kind of concepts. Examples can be found in RDFS or OWL ontologies. URLs are also used to identify information resources.

The term "meeting content" refers to data, information, files, documents, webpages, platforms, applications, presentations, etc. related to, or obtained by a meeting application for a virtual meeting. Content may include images, services (e.g., "National Weather Service"), text, video, audio, scripts, a shared desktop, a combination thereof and/or links to other resources. The meeting content can be input by a user into a meeting application utilizing an input device. The meeting content may be obtained from settings of a meeting application and may be input by a creator of the meeting application. For example, the meeting content may include static, finalized content, such as text, images, etc. that are directly rendered and displayed by the browser. The meeting content may also include linking components that include a link or address of other meeting content. Meeting content may also represent script based components, for which one or more scripts are to be executed before a browser can render and display an executed script (e.g., graphics, text, images, video, audio and the like). Meeting content can also include webpage addresses, webpage text, document text, webpage image, application type, etc.

The term "user desktop" refers to an area or window on a display of an electronic device that includes icons, applications, programs, etc. arranged similar to objects on a top of desk. The icons, applications, programs, etc. each can allow access to that icon, application, program, etc. directly from the desktop. The user desktop is formed and displayed at a primary electronic device of a user.

The term "shared desktop" refers to an area or window that is formed remote to an electronic device, and can be obtained for display by the electronic device. The area or window can include icons, applications, programs, etc. arranged similar to objects on a top of desk. The icons, applications, programs, etc. each can allow access to that icon, application, program, etc. directly from the desktop. The shared desktop is formed in a network, in the cloud, or the like, and not formed at or on the primary electronic device of a user. To this end, to retain the shared desktop, the user must save the shared desktop in a local memory. A user may modify, create, form, etc. the shared desktop via a meeting application, though the shared desktop is maintained in the network, cloud, or the like and not on the primary electronic device of the user. Network based electronic devices may access the share desktop through invitation, shared desktop identifier, meeting link, or the like.

The term "virtual meeting" refers to any meeting conducted over a network. A virtual meeting can include call in information, camera information, video information, screen sharing functionality, recording functionality, etc. The virtual meeting can also include a shared desktop that is associated with the meeting and created for the purposes of sharing information during the meeting.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided for a meeting application that forms a shared desktop associated with a virtual meeting for sharing information. By forming the shared desktop that is at a network resource, such as in the cloud, when information is shared by individuals during the virtual meeting, the user desktop of the individual sharing information is not shared with everyone in the meeting. In this manner, inadvertent disclosures of information, data, email, documents, files, websites, on a user desktop are prevented.

FIG. 1 provides an illustration of a system 100 including a primary electronic device 102. The primary electronic device 102 can be a laptop, CPU, etc. The primary electronic device 102 includes one or more processors 104, a storage device 106, or memory, and a transceiver 108. The transceiver 108 in one embodiment may be a separate receiver and transmitter, while alternatively the transceiver may be a single component. The primary electronic device 102 may optionally include and one or more sensors 110. The one or more sensors can include a camera, microphone, image scanner, etc.

The primary electronic device 102 may include an input device 112 along with a display 114. The input device 112 in one example is a keyboard including keys that may provide inputs that vary documents, platforms, etc. on the display 114. While illustrated with only one display 114, the primary electronic device 102 can include additional displays that may be coupled to one another, including via a USB chord. The primary electronic device 102 may also include a secondary input device 116 that in one example is a mouse. The secondary input device 116 may be electrically coupled to the input device 112 through a wire such as a chord (e.g. USB chord), or may be wirelessly coupled. Alternatively, the secondary input device may be a touch pad on the input device 112. In one example, the display 114 is hingedly coupled to the input device, such as when the primary electronic device 102 is a laptop computer. The display 114 may optionally be detachable from the input device 112. In another embodiment, the display 114 is separate from the input device 112. In such an embodiment, the input device 112 and display 114 may be electrically coupled via a wire or chord (e.g. USB chord), or wirelessly.

The primary electronic device may include a user desktop 118. The user desktop in one example can include applications, electronic mail, icons, programs, etc. that related to the user. The applications, electronic mail, icons, programs, etc. may be related to the user because the user purchased, licensed, utilizes, installed, etc. In one example, at least one personal identification mechanism associated with the user must be utilized to gain access to the desktop. Personal identification mechanisms include a login, password, fingerprint scanner, facial recognition scanner, eye scanner, voice recognition, key, code, or the like. In one example the user desktop is a virtual desktop that may be shared with others. Alternatively, the user desktop is locked from viewing by other.

The primary electronic device 102 may include a meeting application 122 that operates with a network 124 to provide virtual meetings. The meeting application 122 in examples can be Zoom, Webex, gotoMeeting, Google Meets, Microsoft Meets, etc. The meeting application 122 may be a computer program product comprising a non-signal computer readable storage medium that includes computer executable code to receive a list of email addresses. The meeting application 122 may send an email to each of the email addresses that includes at least one of a call in number, link to a webpage, contact information, passcode, meeting number, or the like. The email may also include the time of the meeting, and upload the meeting time and accompanying information on a recipient's calendar. The meeting application 122 also sets up meeting space such that everyone that logs onto the link or calls the call in number can communicate with one another. The meeting application 122 may also include muting options, video feed options, text chat options, and screen sharing.

The meeting application 122 additionally include a shared desktop 126. The shared desktop 126 is a virtual location associated with the meeting that if formed for a one-time use in association with the meeting. In one example, the shared desktop 126 can be accessed by each individual that joins the meeting so that any person in the meeting can place files, presentations, materials on the shared desktop 126. Alternatively, the shared desktop can include a setting where the presenter must grant permission to an individual via a user interface in the meeting before data, information, files, presentations, etc. can be shared on the shared desktop by someone other than the presenter. In yet another example, a passcode, password, public key, etc. is issued to individuals within the meeting invite, after the meeting invite, but before the meeting, during the meeting etc. that allows selected individuals to obtain access to the shared desktop. Optionally, each individual in a virtual meeting can receive the passcode, password, public key, etc. By having a shared desktop 126 that is utilized instead of a user desktop 118, confidential, personal, sensitive, etc. information on the user desktop 118 is protected from being inadvertently shared during a meeting.

In one example, the shared desktop 126 can be a virtual resource that is provisioned in the virtual meeting and configured in the meeting notice. When a user is presenting using the shared desktop, a user interface is provided where the presenter is controlling a virtual computer resource with a desktop manager that is provisioned dynamically in the cloud according to user configuration, instead of utilizing a user desktop. Consequently, all individuals within the meeting only view the virtual shared desktop 126 that is in the cloud when information is being shared. In one example, the user, or other individual utilizing the shared function, selects the document, file, presentation, etc. to be shared, and the document, file, presentation is then communicated to the shared desktop to be viewed by others in the meeting. In this manner, the user, or individual sharing information, must select the document, file, presentation, etc. to be viewed, and no additional documents, files, presentation, etc. on the user's desktop are shared with others in the meeting. Because only selected information to shared, inadvertent disclosures are prevented.

Figure 2:
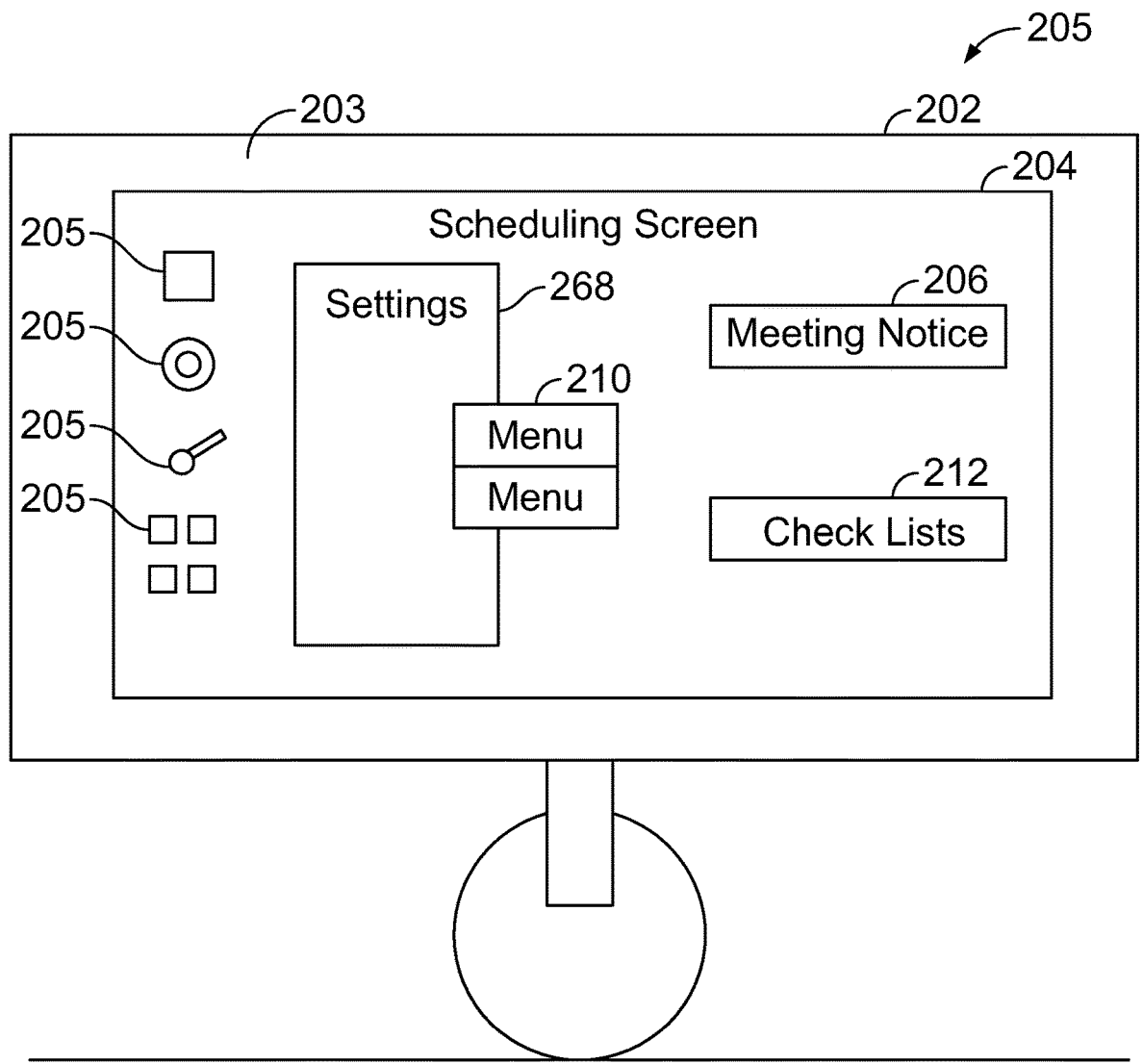
FIG. 2 illustrates a schematic diagram of a primary electronic device in accordance with embodiments herein.

The shared desktop 126 in one example is configured in the meeting notice (FIG. 2). The meeting notice can include pull down menus, checklists, etc. to allow the individual setting the meeting to control the features, access, etc. of the shared desktop 126. Configuration can include access management, including who has access to the shared desktop. In one example, all individuals that receive a meeting invite automatically are selected for access to documents, files, presentations, etc. on the shared desktop 126. In another example, only selected individuals invited to the meeting have such access. In yet another example, one or more individuals that were not invited to the meeting can also receive access to the shared desktop 126. Optionally, the configuration can also include the type of device, operating system, application, environment variable, or the like that can be part of the provision configuration. This type of configuration prevents meeting attendees having incompatible devices, systems, or the like from attending the meeting resulting in bandwidth and system issues for everyone in the meeting. In another embodiment, a meeting host could provision resources for participant, and/or participants could also alter or add resources. To this end, resource configuration could be part of meeting meta data that is acted on by network based electronic devices of participants. In this manner, the user setting up the meeting has control over the management of the shared desktop 126, including access, before a meeting even occurs.

Once the meeting has started, any document, file, presentation, etc. that is on the shared desktop can be manipulated by the individual sharing the document, file, presentation, etc. In this manner, if a document is being reviewed by a group of individuals, changes can be made by the individual sharing the document. In one example, once the document, file, presentation, etc. is on the shared desktop, the only way to remove the document, file, presentation, etc. is for the individual sharing the screen to select the document, file, presentation, etc. for removal. As a result, another individual in the meeting has the option to control the shared desktop and manipulate the document, file, presentation, etc.

The primary electronic device 102 communicates through the network 124 to provide the emails, invites, passcodes, etc. to the different email addresses at a plurality of network based electronic devices 130. In one example, the network based electronic devices 130 are remote electronic devices at a different location than the primary electronic device 102. The communication through the network 124 between the primary electronic device 102 and network based electronic devices 130 in example embodiments include over a wire, through one or more wireless protocols including Bluetooth, GSM, infrared wireless LAN, HIPERLAN, 4G, 5G, satellite, or the like.

Each of the plurality of network based electronic devices 130 includes one or more processors 132, a storage device 134 such as a memory, and a transceiver 136 for receiving communication. The network based electronic devices 130 may each also have a display 138. The network based electronic devices 130 may include smart phones, smart watches, smart TVs, tablet devices, personal digital assistants (PDAs), or the like.

FIGS. 2-5 illustrate an example primary electronic device 200 with a display 202, and that includes a meeting application. In one example, the meeting application is the meeting application of FIG. 1. FIG. 2 illustrates a user desktop 203 with a scheduling screen 204 on the display 202 for the meeting. The user desktop can include icons for opening files, applications, documents, programs, etc. The scheduling screen 204 of the meeting application presents a meeting notice 206 can have settings 208 include pull down menus 210, checklists 212, etc. to allow the individual setting the meeting to control the features, access, etc. of the shared desktop. In one example, a meeting is provided for the presenter to provide a presentation to one hundred (100) individuals as part of a conference. Consequently, in the settings 208, only the presenter has access to the shared desktop during the meeting. In addition, during the meeting, the presenter may have a user interface that that allows to select an individual at the meeting to provide access to the virtual desktop during the meeting. In this manner, if an individual attending the meeting using a network based electronic device has material that is relevant to the presenter, the attendee may share the information on the shared desktop only after receiving permission from the user.

In another example, the meeting may be a brainstorming session between five (5) team members located in different locations. In the settings 208, the user setting up the meeting may grant access to the shared desktop to each team member for before and during the meeting. In this manner, each individual attending the meeting may populate the shared desktop at their convenience before the meeting, with the information, data, files, etc. populated saved in the cloud on the shared desktop before the meeting even begins. As a result, time is automatically saved because when each individual presents ideas, the other team members do not need to wait while a different team member tracks down and shares their data, information, files, etc.

In yet another example, the settings may include the types of devices, operating systems, applications, environmental variables, or the like that are part of the provisioning application. For instance, a presentation or data file, etc. may not be compatible with certain electronic devices. Alternatively, certain electronic devices may only be able to receive so many bytes of data without causing performance issues. By configuring the settings before the meeting, the meeting application may access an electronic device to ensure compatibility with the shared desktop. In one example, when an electronic device is not compatibility because of the operating system, data restrictions, etc. a message may be communicated by the meeting application to the electronic device. The message may be a text message, electronic message, notification, etc. to allow a user of the network based electronic device that the device is unable to access the shared desktop and only listening functionality will be provided. In this manner, the user of the network based electronic device may use a different network based electronic device, request shared desktop data, information, files, etc. be communicated (e.g. emailed) prior to the meeting, or the like. Alternatively, the user of the incompatible network based electronic device may alter their electronic device to become compatible before the meeting.

In one example, the meeting invite includes resource configuration within the meeting metadata so that the user of the incompatible network based electronic device may easily and quickly update their network based electronic device before the meeting to obtain and view of the shared desktop. In addition, by having the shared desktop 126 in the cloud, the meeting application 122 can obtain meeting content, including meeting times related to user or attendee, meeting configuration, meeting setting, etc. to manage the spinning up and spinning down of the shared desktop 126 in the cloud to consolidate and facilitate use. Spinning up and spinning down as used herein refers to the staring up and ending of resources, infrastructure, or the like in the cloud for a meeting that will include the shared desktop. In this manner, the meeting application 122 in one example can manage each shared desktop and corresponding meeting based on provision configurations from the meeting host and participant.

Figure 3:
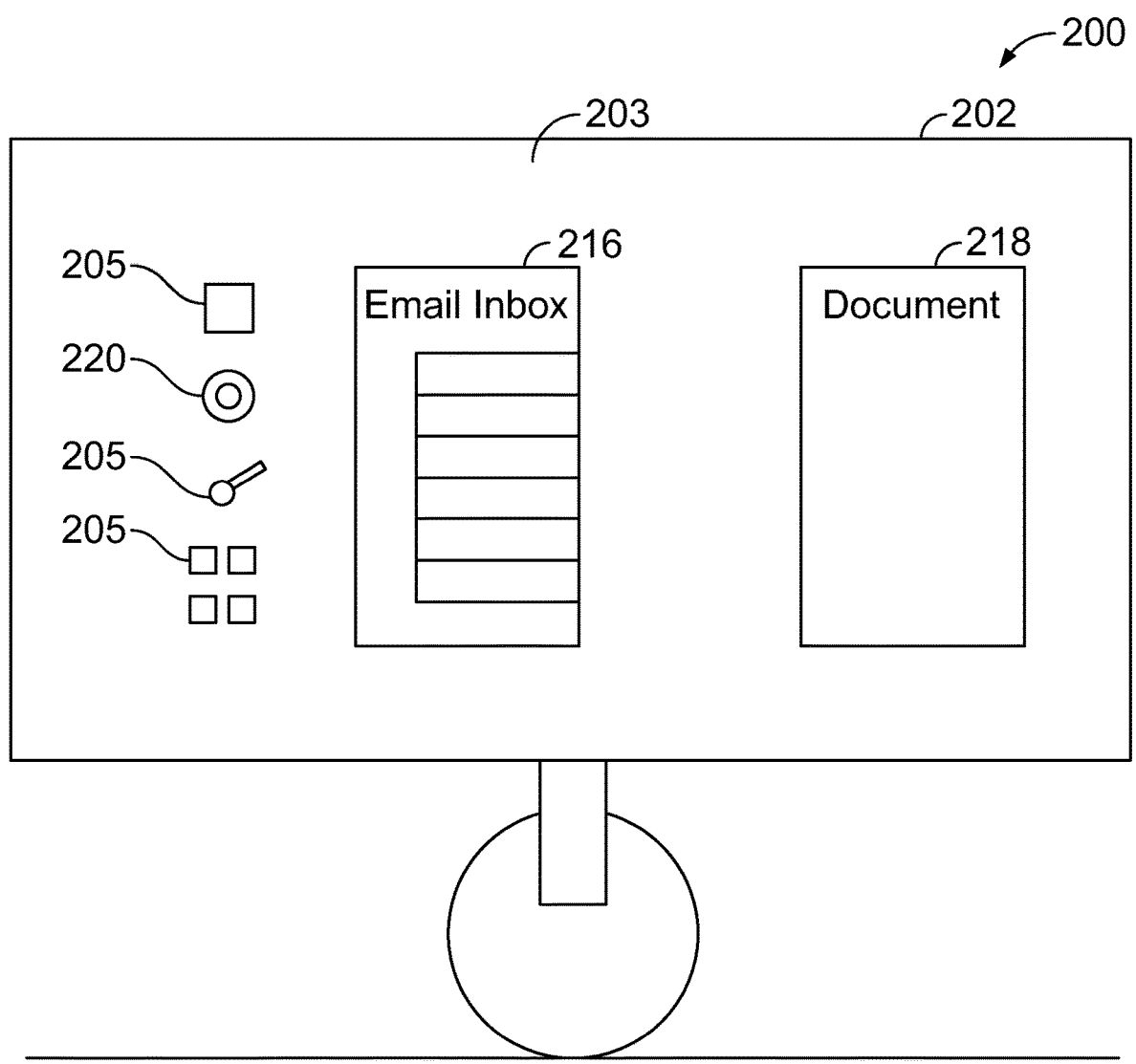
FIG. 3 illustrates a schematic diagram of a primary electronic device in accordance with embodiments herein.

FIG. 3 illustrates the primary electronic device 200 after the meeting is scheduled, but before the meeting begins. In particular, on the display 202 is the user desktop 203 that can include an email inbox 216, open documents 218, web browser 220, icons 205 for different applications, or the like. In one example, the email inbox 216 includes numerous confidential emails related to a project, while the open documents 218 include drafts that also contain confidential information. As a result, both the email inbox 216 and open documents contain information that is not desired to shared with others. In another example, the web browser may be open to a fantasy football league that an employee was viewing over their lunch hour and had not closed. Again, the employee has no desire to share with others the fantasy football league.

When a meeting is launched using the meeting application by the user of the primary electronic device 200, user desktop 203 is not shared with the other individuals that join the meeting. In one example, a shared desktop 224 (FIG. 4) is automatically populated onto the display 202 of the user along with the display of each network based electronic device that joins the meeting. Alternatively, the only meeting information is displayed on the display 202 of the user and the network based electronic devices. In this embodiment, the meeting application provides a user interface 226 on the display for use by the host user. The user interface may include activation buttons 228 that can include a mute button 230, camera button 232, a share screen button 234, and the like. In one example, instead of, or in addition to, a share screen button 234, a shared desktop button 236 is provided. The buttons as describe herein are items on a user interface 226 that may be actuated to cause functionality by the meeting application. The button may be actuated through a user touching a button as a result of having a touchscreen, scrolled over an executed by a mouse or pointer, manually actuated using arrow keys or other keys of a keyboard, or the like.

In one example, when a share screen button 234 is provided, upon actuation of the share screen button 234, an option menu will appear on the display 202 of the user. The option menu can include a choices of a display, a first display, a second display, a shar screen display, or the like. At this point, the user can then select the screen or desktop to be viewed by others in the meeting. In this manner, the user keeps control and is able to show information from their own desktop if desired during a call, instead of being forced to provided everything on the shared desktop. In some examples, a quick, non-confidential meeting may be desired where utilizing a shared screen simply is not desired. In these instances, a user can simply select to share one of their displays without using a shared desktop.

Figure 4:
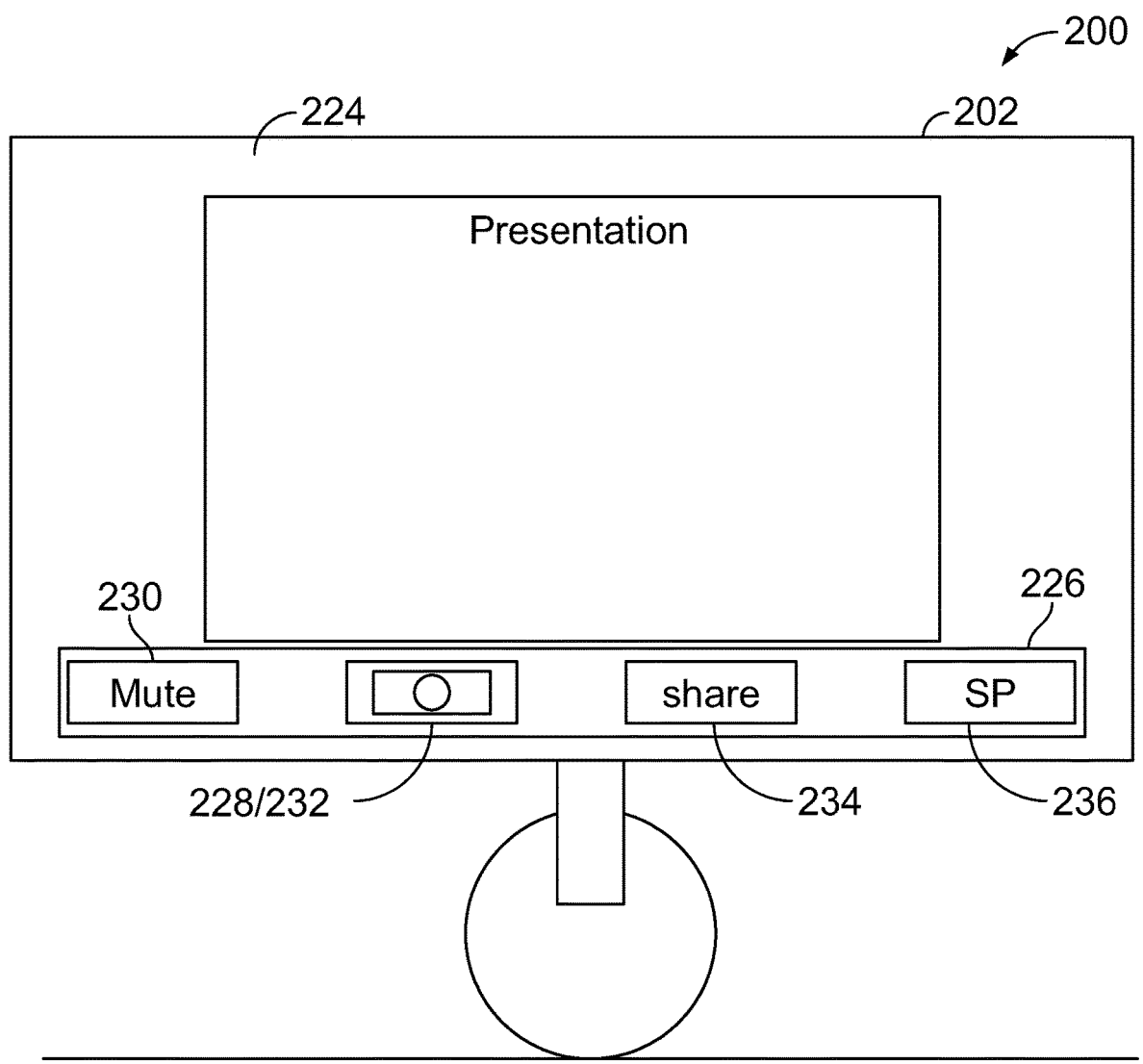
FIG. 4 illustrates a schematic diagram of a primary electronic device in accordance with embodiments herein.

FIG. 4 illustrates a shared desktop 224 on the display 202. The shared desktop may have launched as a result of the meeting application launching, or as a result of launching the shared desktop 224 with an actuations button such as the share screen button 234 or using a shared desktop button 236. In either case, the shared desktop 224 can then be viewed by all members within the meeting. If desired, other individual in the meeting may also access the shared desktop 224 before, during, or after the meeting to provide data, information, files, etc. on the shared desktop 224. By utilizing the shared desktop 224, the individuals on the call can only view the shared desktop 224, without having the possibility of viewing confidential information, personal information, or the like of the user. As a result, information is more secure, while potential embarrassing moments (e.g. a boss seeing you are checking your fantasy football league at work) are also reduced, making use of the meeting application more user friendly.

After a meeting is over, the shared desktop may be saved in the cloud for a determined period of time to allow access by individuals in the meeting. In order to save data in the cloud, the shared desktop may be eliminated after the determined period. In one example, the shared desktop may be communicated to the user, or other individual in the meeting to be saved for future reference. In this manner, the shared desktop does not need to be saved in the cloud and taking up data in the cloud. An individual can save the desktop locally and then reuse the shared desktop if needed.

Figure 5:
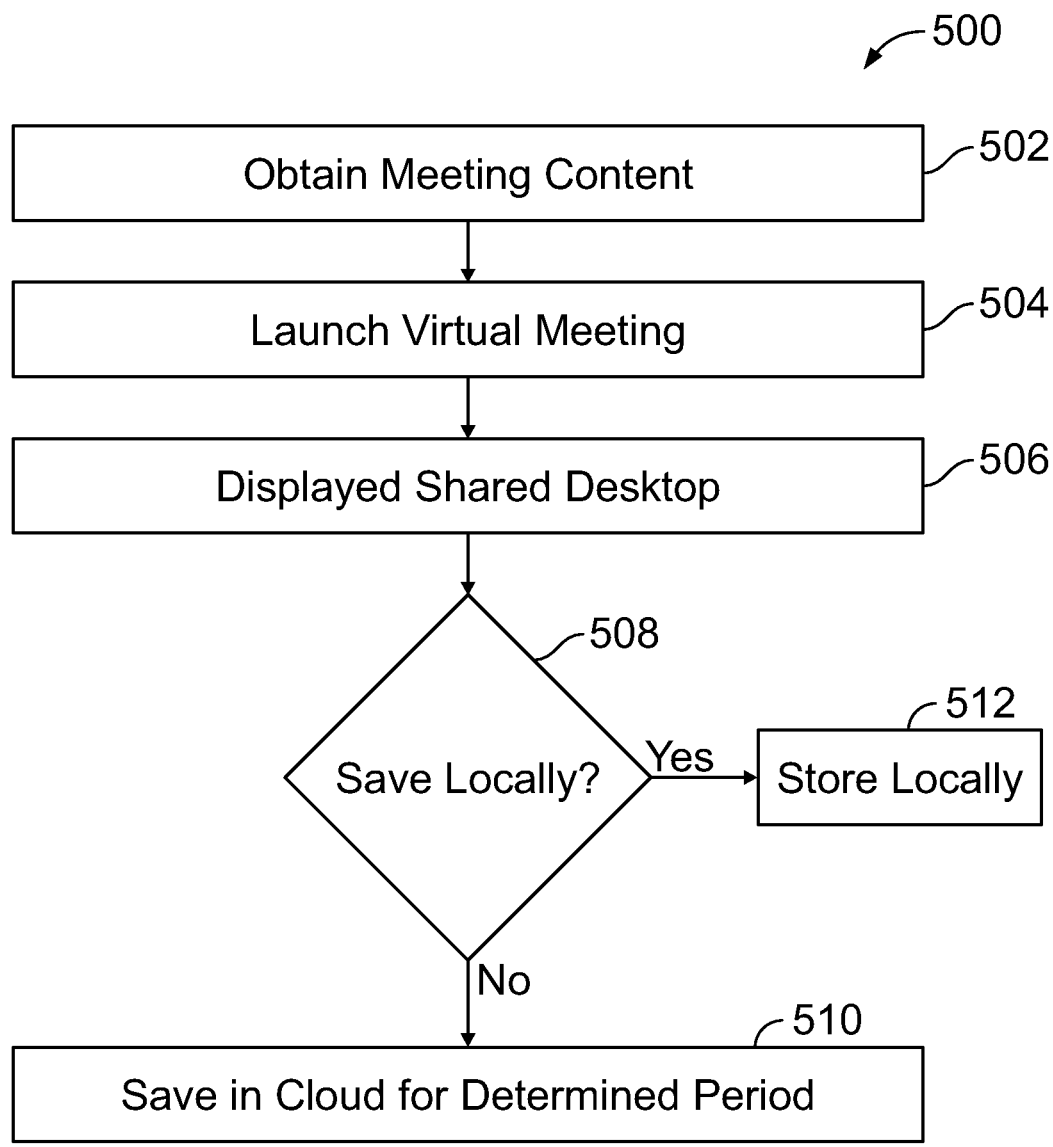
FIG. 5 illustrates a block flow diagram of a method for managing content for a virtual meeting in accordance with embodiments herein.

FIG. 5 illustrates a process 500 for controlling content when in a virtual meeting. In one example the system of FIGS. 1-4 is utilized to implement the process.

At 502, one or more processors obtain meeting content input into a meeting application. In one example, the meeting application is one of the meeting applications of FIGS. 1-4. The content may be input by a user via an input device, including a keyboard, mouse, pointer, dictation device, etc. The content may include data, information, files, presentations, etc. that are placed on a shared desktop related to the meeting. In one example, the shared desktop is the shared desktop of one of FIG. 1, or 2-4. The shared desktop may be formed in the cloud and contain information placed by the user, other individuals that have access to the shared desktop, other individuals at the meeting, etc. A menu may be provided by the meeting application to allow the attachment of documents, files, presentations, spreadsheets, photographs, images, or the like to be on shared desktop. In one example, the shared desktop from a previous meeting may have been saved by the user and input as the shared desktop for the meeting. In another example, a password, passcode, key, or the like must be utilized to obtain access to the shared desktop for viewing and placing information on the shared desktop. Alternatively, the security measures only are required for placing information on the shared desktop, and not for viewing the shared desktop.

At 504, the one or more processors launch a virtual meeting that includes a shared desktop based on the meeting content input by the user. In one example, at the time of the meeting, the user actuates the meeting application to start the meeting. In one example, at the time the meeting is launched, the shared desktop is presented on a display device of network based electronic devices used by individuals that have joined the meeting. Alternatively, the meeting simply begins with each screen generated by the meeting application including a user interface for functions such as mute, camera display, text chat, screen sharing, and the like.

At 506, the one or more processors display the shared desktop at the displays of the network based electronic devices of users attending the meeting. The shared desktop to provided in the cloud and does not include any information specific to the user's desktop, and instead, only includes information, data, files, presentations, etc. placed by the user, or an individual having access to the shared desktop. No additional information can be observed by individual in the meeting.

At 508, after the ending of the meeting, a determination is made whether to save the shared desktop locally. If at 508, there is no desire to save the shared desktop locally, at 510, the shared desktop is stored in the cloud for a determined period. By storing the shared desktop in the cloud for a determined period, a user or individual attending the meeting can still access the shared desktop if desired. In one example, the determined period is one week. In another example, the determined period is one month. Alternatively, if at 508 a desire exists to save the shared desktop locally, then at 512 the one or more processors locally save the shared desktop in a memory. In one example, the one or more processors automatically saves the shared desktop in a local file, folder, drive, etc. In another example, the use, or an individual having access to the shared desktop can save the shared desktop locally. In one example, once the shared desktop is saved locally, the shared desktop is removed from the cloud. Alternatively, the shared desktop remains in the cloud for the determined period regardless of whether saved locally. In yet another example, the user my delete the shared desktop from the cloud prior to the end of the determined period. In this manner, additional space for data, information, files, presentation, etc. is provided in the cloud. As a result, overall security is improved while also enhancing functionality of the meeting application.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
    a display;
    a processor;
    a data storage device having executable instructions accessible by the processor;
    wherein, responsive to execution of the instructions, the processor:
    displays a user desktop related to a user;
    creates a virtual meeting that is configured to be attended by communication through a network by at least one network based electronic device;
    generates a shared desktop related to the virtual meeting that is configured to be shared with the at least one network based electronic device via the network; and
    displays the shared desktop during the virtual meeting.

2. The electronic device of claim 1, wherein, responsive to execution of the instructions, the processor further: obtains meeting content input into a meeting application; and generates the shared desktop based on the meeting content.

3. The electronic device of claim 2, wherein, responsive to execution of the instructions, the processor further:
    launches the virtual meeting that includes the shared desktop based on the meeting content.

4. The electronic device of claim 2, wherein responsive to execution of the instructions, the processor further: invites attendees based on the meeting content.

5. The electronic device of claim 1, wherein responsive to execution of the instructions, the process further: determines a shared desktop identifier, and communicates the shared desktop identifier to the at least one network based electronic device.

6. The electronic device of claim 5, wherein the shared desktop identifier is one of a password, executable code, or a key.

7. The electronic device of claim 1, wherein the shared desktop includes a user interface for controlling access to the shared desktop.

8. The electronic device of claim 1, wherein the network includes at least one of a cloud, a cellular network, a wireless network, or a Wi-Fi based network.

9. A method, comprising:
    under control of one or more processors including program instructions to:
    display a user desktop related to a user;
    create a virtual meeting that is configured to be attended by communication through a network by at least one network based electronic device;
    generate a shared desktop related to the virtual meeting that is configured to be shared with the at least one network based electronic device via the network; and
    display the shared desktop during the virtual meeting.

10. The method of claim 9, wherein the one or more processors include program instructions to obtain meeting content input into a meeting application; and generate the shared desktop based on the meeting content.

11. The method of claim 10, wherein the one or more processors include program instructions to:
    launch the virtual meeting that includes the shared desktop based on the meeting content.

12. The method of claim 10, wherein the one or more processors include program instructions to invite attendees based on the meeting content.

13. The method of claim 10, wherein the one or more processors include program instructions to spin up or spin down the shared desktop based on the meeting content.

14. The method of claim 9, wherein the one or more processors include program instructions to determine a shared desktop identifier, and communicate the shared desktop identifier to the at least one network based electronic device.

15. The method of claim 9, wherein the one or more processors include program instructions to save the shared desktop in response to an end of the virtual meeting.

16. A computer program product comprising a non-signal computer readable storage medium comprising computer executable code to:
    display a user desktop related to a user;
    create a virtual meeting that is configured to be attended by communication through a network by at least one network based electronic device;
    generate a shared desktop related to the virtual meeting that is configured to be shared with the at least one network based electronic device via the network; and
    display the shared desktop during the virtual meeting.

17. The program product of claim 16, wherein the computer executable code to obtain meeting content input into a meeting application; and generate the shared desktop based on the meeting content.

18. The program product of claim 16, wherein the computer executable code to launch the virtual meeting that includes the shared desktop based on the meeting content.

19. The program product of claim 16, wherein the computer executable code to determine a shared desktop identifier, and communicate the shared desktop identifier to the at least one network based electronic device, and wherein the computer executable code grants access to the at least one network based electronic device to alter the shared desktop based on the shared desktop identifier.

20. The program product of claim 15, wherein the computer executable code to save the shared desktop for a determined period in response to an end of the virtual meeting.

\* \* \* \* \*